(12) United States Patent
Nakagawa et al.

(10) Patent No.: US 6,346,995 B1
(45) Date of Patent: *Feb. 12, 2002

(54) COMMUNICATION APPARATUS WITH OUTGOING CALL LIMITING

(75) Inventors: Kaori Nakagawa, Kawasaki; Kenzo Sakakibara, Yokohama; Koichi Matsumoto, Tokyo; Shinichiro Kohri; Makoto Kobayashi, both of Kawasaki, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/858,036

(22) Filed: May 16, 1997

Related U.S. Application Data

(63) Continuation of application No. 08/648,864, filed on May 16, 1996, now abandoned, which is a continuation of application No. 08/260,217, filed on Jun. 14, 1994, now abandoned.

(30) Foreign Application Priority Data

Jun. 29, 1993 (JP) .............................................. 5-185553
Nov. 18, 1993 (JP) .............................................. 5-312738

(51) Int. Cl.$^7$ ................................................. H04N 1/32
(52) U.S. Cl. ...................... 358/434; 358/438; 379/93.09
(58) Field of Search .................. 358/400, 434–436, 358/438–440, 442, 468; 379/93.09, 93.32, 93.34, 93.35, 100.05, 100.09, 70, 210, 212, 213, 215; H04N 1/32

(56) References Cited

U.S. PATENT DOCUMENTS 3,914,538 A * 10/1975 Perreault et al. ................ 178/6
4,239,385 A   12/1980 Ejiri ............................ 358/434

(List continued on next page.)

FOREIGN PATENT DOCUMENTS

EP   674 416 A2 * 9/1995 ............ H04N/1/32
GB   2253969 A     9/1992

(List continued on next page.)

OTHER PUBLICATIONS

Official Action Letter dated Nov. 5, 1999, w/English Translation.

Primary Examiner—Kimberly A. Williams
(74) Attorney, Agent, or Firm—Fitzpatrick, Cella, Harper & Scinto

(57) ABSTRACT

A communication apparatus comprises a communicating circuit, a connecting unit for connecting a telephone or the communicating circuit to a line, a disconnecting unit for disconnecting the telephone from the line, a call reception detection circuit, a detection circuit for detecting a hook state of the telephone, an output unit for outputting a signal indicating that the call generation limitation mode has been set, a display for displaying that the apparatus is in the call generation limitation mode, and a dial signal transmission unit. A call generation of an attached telephone can be limited with a simple construction and a call generation limiting function of the data communication apparatus can be certainly realized.

39 Claims, 11 Drawing Sheets

U.S. PATENT DOCUMENTS

| | | | |
|---|---|---|---|
| 4,639,553 A | * | 1/1987 | Kiguchi ..................... 379/100 |
| 4,825,461 A | * | 4/1989 | Kurita et al. ................. 379/93 |
| 4,833,705 A | | 5/1989 | Kobayashi .................... 379/93 |
| 4,850,008 A | * | 7/1989 | Berg et al. .................. 379/100 |
| 4,893,335 A | | 1/1990 | Fuller et al. ................ 379/200 |
| 4,910,764 A | * | 3/1990 | Bowen ....................... 379/100 |
| 4,939,777 A | * | 7/1990 | Oka .......................... 379/100 |
| 4,953,199 A | * | 8/1990 | Hoshii et al. ............... 379/100 |
| 5,033,078 A | * | 7/1991 | Andoh ....................... 379/100 |
| 5,042,028 A | * | 8/1991 | Ogawa ..................... 370/58.2 |
| 5,138,655 A | | 8/1992 | Takashima et al. ......... 379/157 |
| 5,151,972 A | * | 9/1992 | Lorenz et al. .............. 379/100 |
| 5,185,783 A | * | 2/1993 | Takahashi et al. ............ 379/93 |
| 5,239,576 A | | 8/1993 | Yoshida et al. ............. 379/355 |
| 5,255,312 A | * | 10/1993 | Koshiishi ................... 379/100 |
| 5,283,826 A | * | 2/1994 | Kurosawa et al. .......... 379/357 |
| 5,307,279 A | | 4/1994 | Yoshida ..................... 358/440 |
| 5,369,688 A | * | 11/1994 | Tsukamoto et al. ......... 379/100 |
| 5,832,060 A | * | 11/1998 | Corlett et al. |
| 5,974,123 A | * | 10/1999 | Nakayama et al. .... 379/100.16 |

FOREIGN PATENT DOCUMENTS

| | | |
|---|---|---|
| JP | 57-188171 | * 11/1982 |
| JP | 58-26252 | 2/1983 |
| JP | 58-68331 | 4/1983 |
| JP | 59-67761 | 4/1984 |
| JP | 59-127358 | 7/1984 |
| JP | 61-118068 | 6/1986 |
| JP | 1-180174 | 7/1989 |
| JP | 3-36250 | 4/1991 |
| JP | 5-41251 | 2/1993 |
| WO | WO 93/00762 | 1/1993 |

* cited by examiner

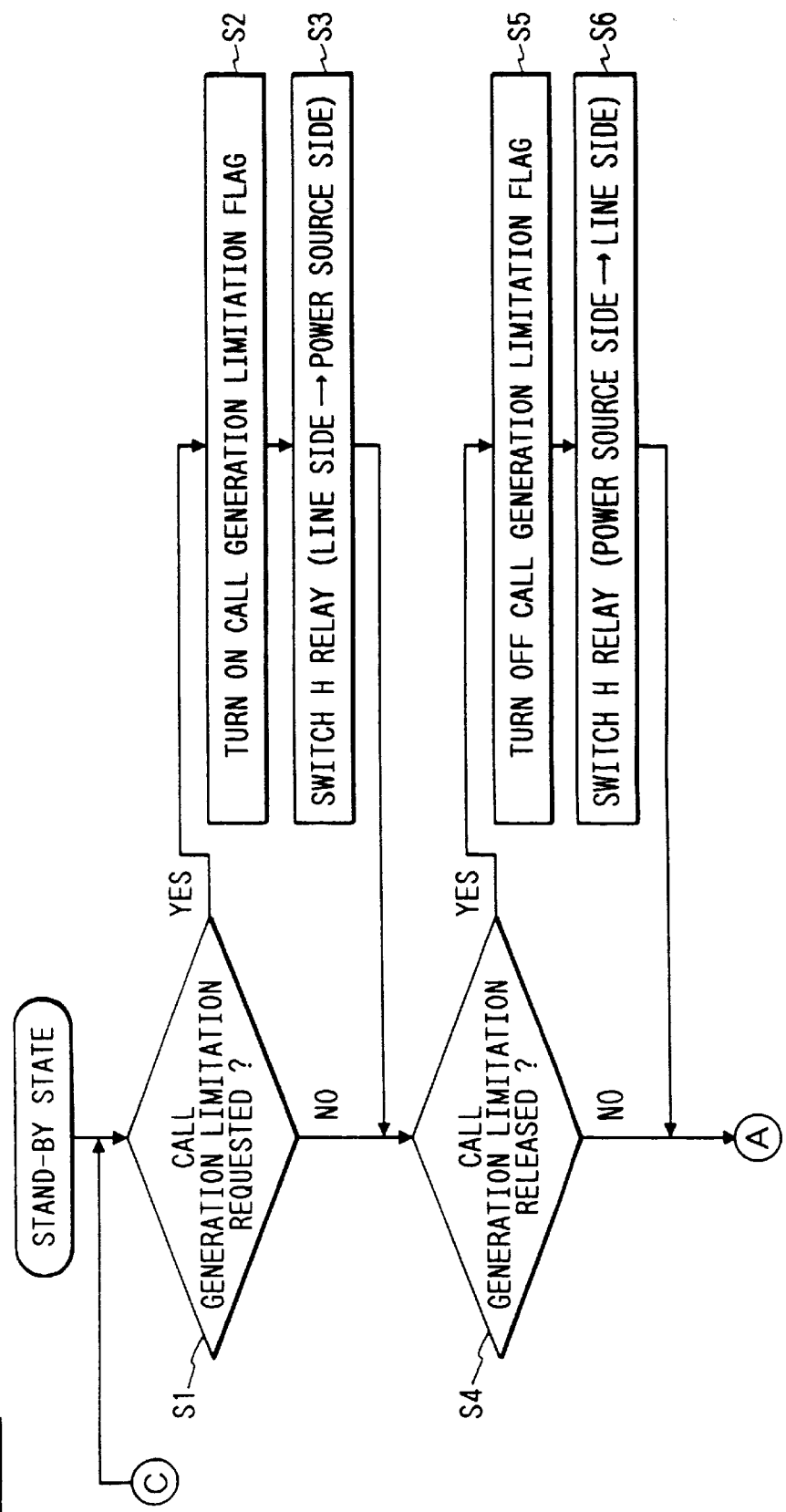

COMMUNICATION APPARATUS WITH OUTGOING CALL LIMITING

This application is a continuation of application Ser. No. 08/648,864 filed May 16, 1996, now abandoned, which is a continuation of Ser. No. 08/260,217 filed Jun. 14, 1994, abandoned.

BACKGROUND OF THE INVENTION

1. Field of the Invention

The present invention relates to a communication apparatus having a call generation limiting function and an attached telephone.

2. Related Background Art

Among facsimile apparatuses, there is a facsimile apparatus having a call generation limiting function to limit a call generation for a facsimile transmission or the like.

According to the call generation limiting function, for example, a key code for a specific call generation limitation is set and the user inputs the key code from an operation panel of a facsimile apparatus, thereby setting the facsimile apparatus into a call generation limitation state.

The conventional call generation limiting function as mentioned above, however, limits only a call generation from the facsimile apparatus main body, so that a call can be generated from an attached telephone and a handset.

SUMMARY OF THE INVENTION

It is an object of the present invention to provide a communication apparatus which can limit a call generation of an attached telephone.

It is another object of the invention to limit the call generation of the attached telephone by a simple construction.

Further another object of the invention is to certainly realize a call generation limiting function of a data communication apparatus.

The above and other objects and features of the present invention will become more apparent from the following detailed description and appended claims with reference to the accompanying drawings.

DETAILED DESCRIPTION OF THE PREFERRED EMBODIMENTS

Figure 1:
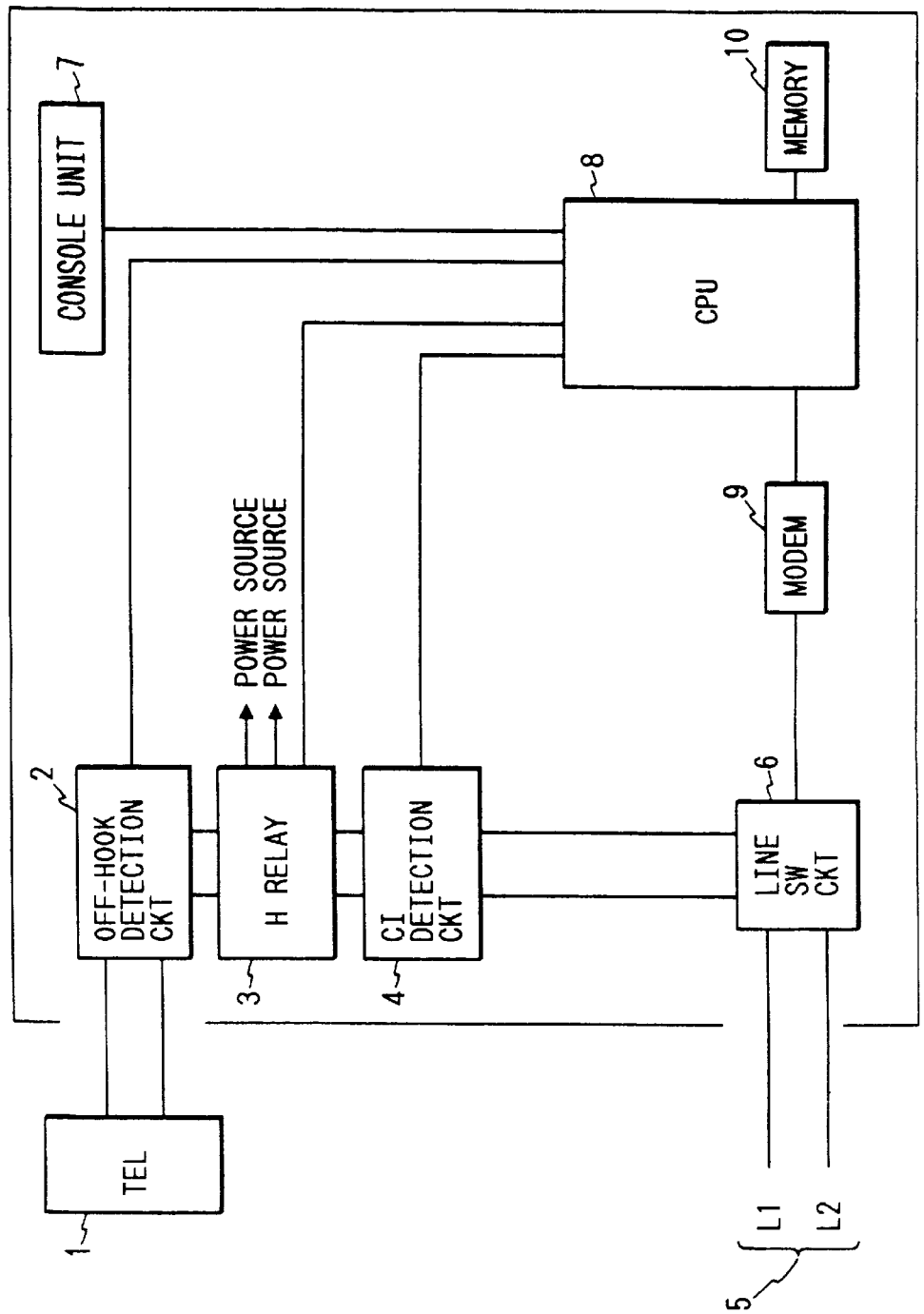
FIG. 1 is a schematic constructional diagram of the first embodiment of the invention.

FIG. 1 is a block diagram showing a construction of a facsimile apparatus in an embodiment of the invention.

The facsimile apparatus of the embodiment comprises: an off-hook detection circuit 2 to which a telephone 1 is connected and which detects the on-hook/off-hook of the telephone 1; an H relay 3 for switching the telephone 1 to a line 5 side or a power source side and for applying a voltage to the telephone 1; a CI detection circuit 4 for detecting a CI (call signal) from the telephone line 5 (L1–L2); a line switching circuit (CML relay) 6 for switching the telephone line 5 to the telephone 1 or a modem 9 side; a console unit 7 for executing various kinds of key inputs; a CPU 8 for controlling a whole apparatus main body; the modem 9 for executing modulation/demodulation of transmission/reception signals; and a memory 10. The line switching circuit includes a dialing circuit to transmit a dial pulse or a PB signal.

Figure 2B:
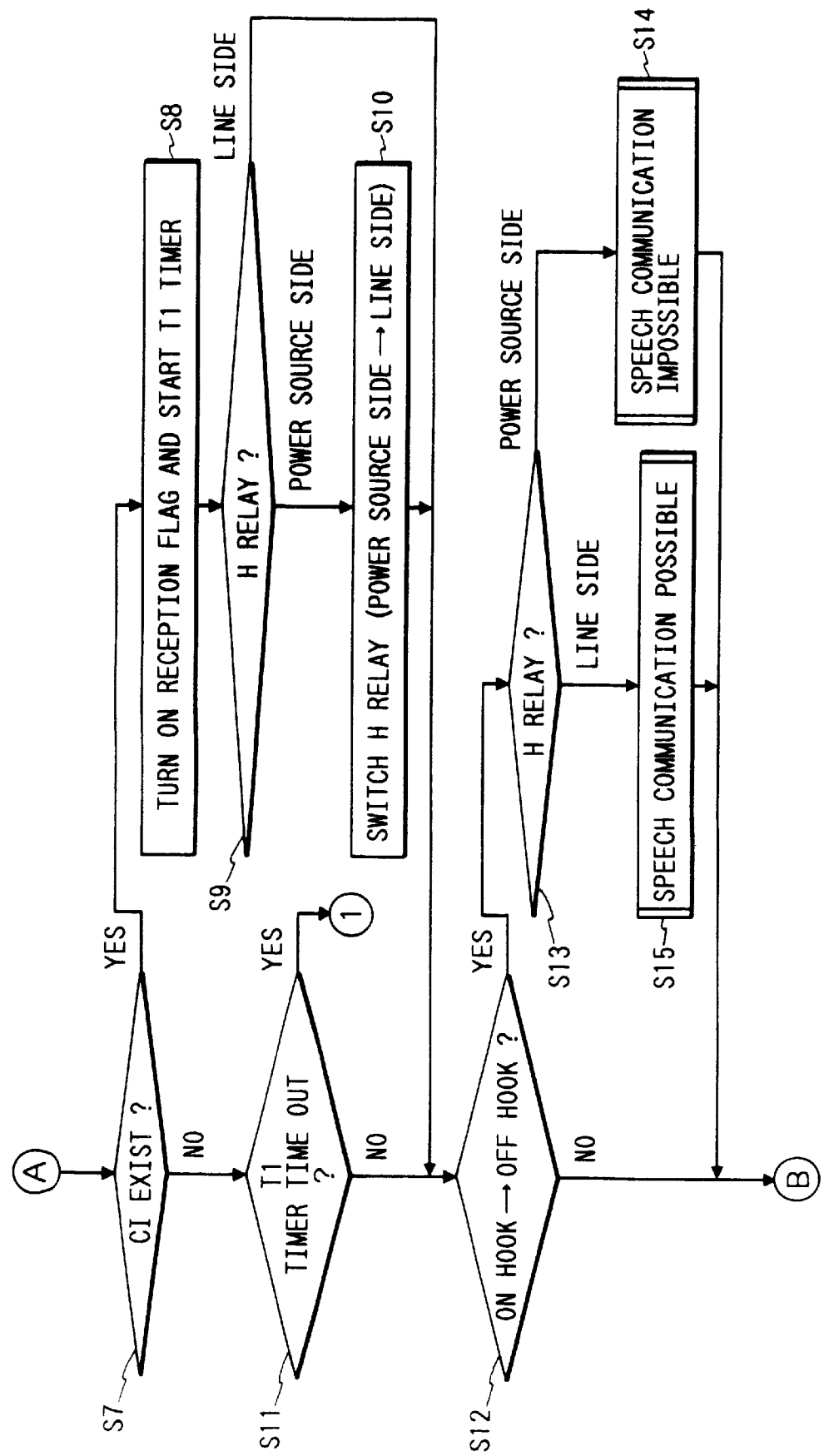
FIG. 2 is comprised of FIGS. 2A to 2C are flowcharts showing the operation of the first embodiment.
Figure 2C:
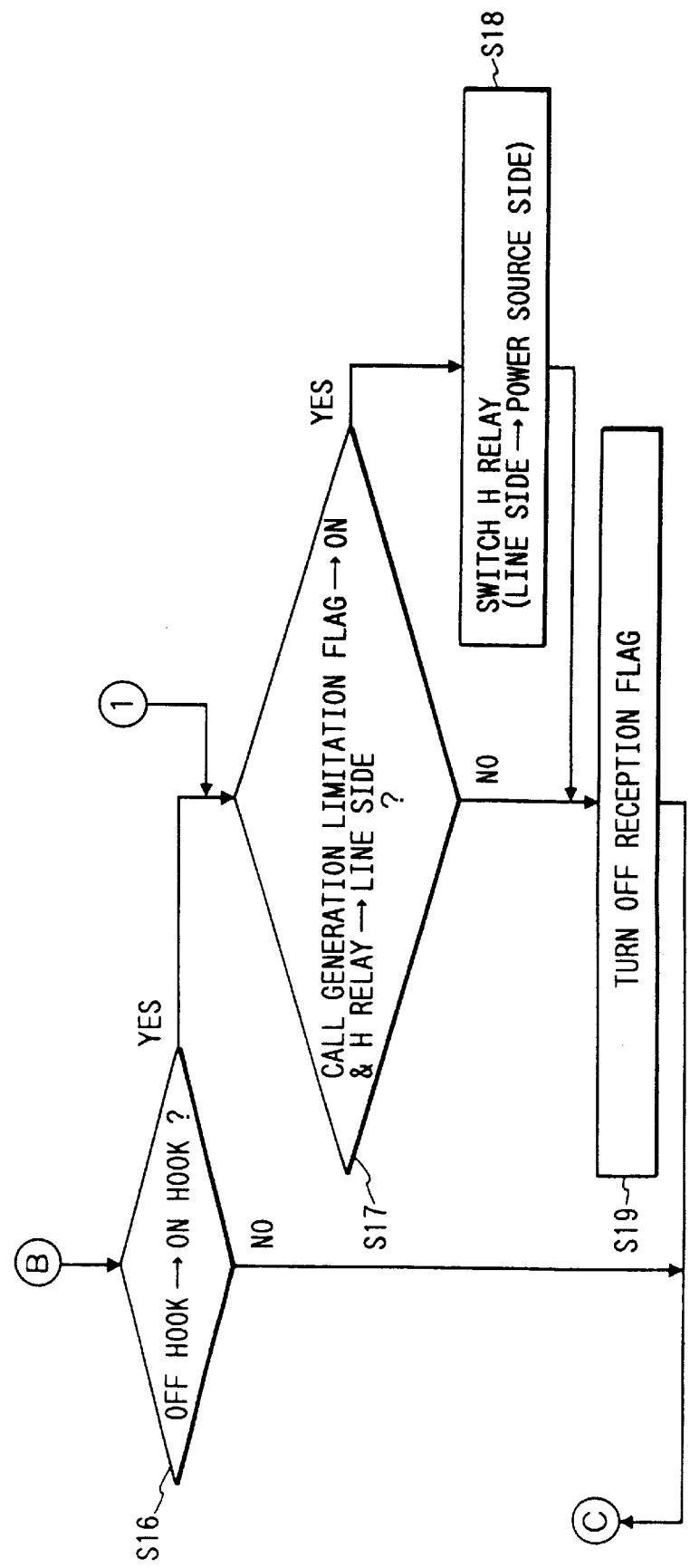

FIGS. 2A to 2C are flowcharts showing the operation in the first embodiment. The line switching circuit 6 is set so that the line 5 is connected to the telephone 1 in an initial state.

When a call generation limitation is requested from the console unit 7 by the operator (S1), the CPU 8 turns on a call generation limitation flag in a predetermined region in the memory 10 (S2) and switches the H relay 3 from the line 5 side to the power source side (S3). Since telephone 1 is not connected t0 line 5, an outgoing call cannot be initiated by the telephone. When the call generation limitation is released (S4), the call generation limitation flag is turned off (S5) and the H relay is switched from the power source side to the line side (S6) and the telephone 1 can initiate an outgoing call.

When a CI signal is received from the line 5 and the CI signal is detected by the CI detection circuit 4 (S7), a reception flag in a predetermined region in the memory 10 is turned on and a T1 timer provided on the memory 10 is started (S8).

When the call generation of outgoing calls is limited (S9), since the H relay 3 has been set to the power source side, the CPU 8 switches the H relay 3 from the power source side to the line 5 side (S10). Due to this, the CI signal from the line 5 reaches the telephone 1, a ringer of the telephone 1 is rung, and the signal reception is informed to the operator. It is also possible to construct in a manner such that when the CI signal is detected, a buzzer of the console unit is rung and when the telephone 1 is off hooked, the H relay 3 is switched to the line 5 side.

After the elapse of a T1 time since the CI signal was not detected (S11), if the call generation is limited (S17), the CPU 8 again switches the H relay 3 to the power source side (S18) and turns off the reception flag (S19).

When the telephone 1 is off hooked at the time of call generation limitation (S12), since the H relay 3 is on the power source side at the time of call generation (S13), a selection signal is not transmitted to the line 5, so that the operator cannot perform the speech communication (S14). When the operator is called, since the H relay 3 is on the line 5 side (S13), the speech communication can be performed (S15).

In the case where the telephone 1 is on hooked (S16), if the call generation is limited (S17), the H relay 3 is again switched to the power source side (S18) and the reception flag is turned off (S19).

In an automatic reception mode, when the CI signal is detected, the line switching circuit 6 is switched to the modem 9 side and the automatic reception is executed.

In a state in which the call generation limitation flag has been turned on, even when a call generation is instructed from the console unit 7, it is rejected.

Figure 3A:
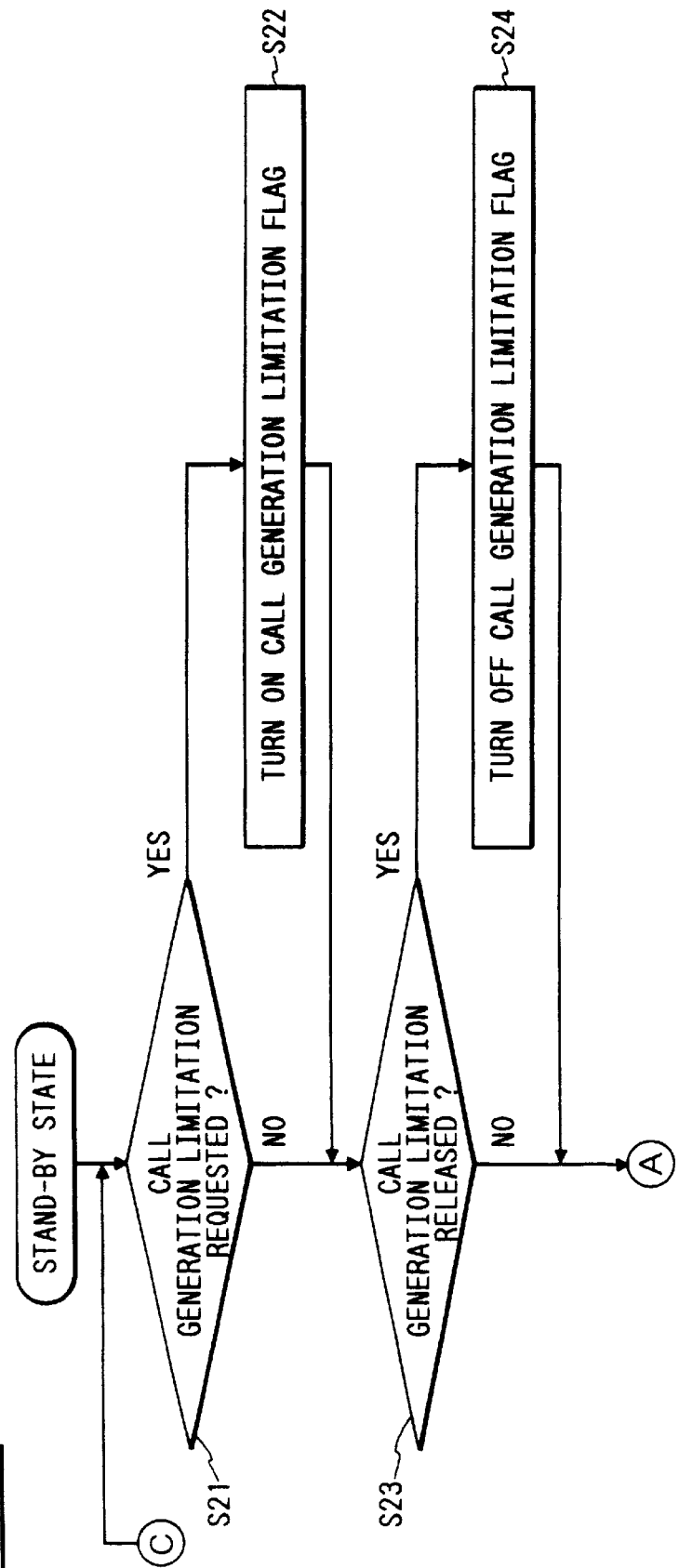
FIG. 3 is comprised of FIGS. 3A to 3C are flowcharts showing the operation of the second embodiment of the invention.
Figure 3B:
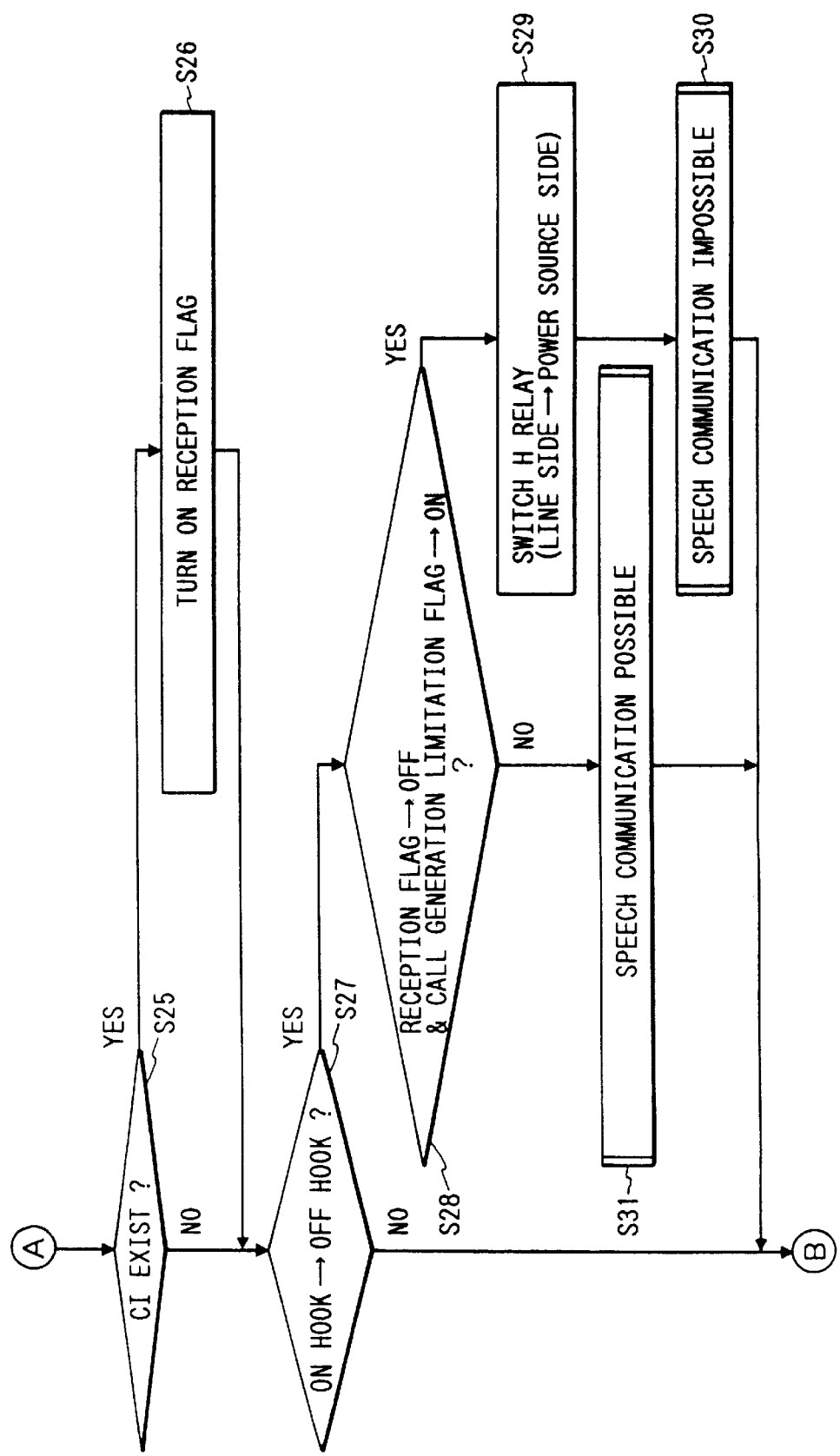
Figure 3C:
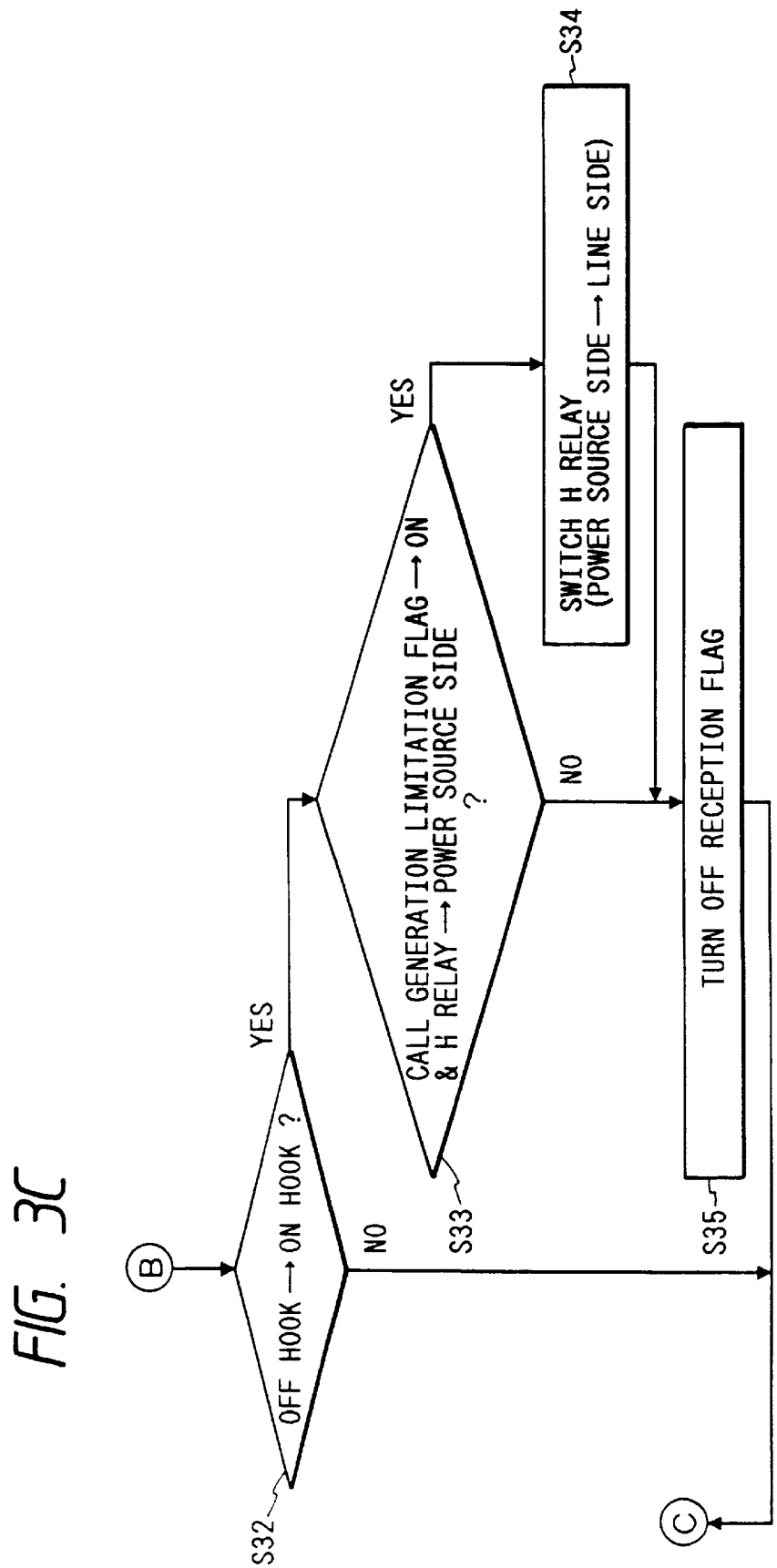

FIGS. 3A to 3C are flowcharts showing the operation in the second embodiment. An apparatus of the second embodiment will be explained on the assumption that the apparatus has the construction shown in FIG. 1.

In the initial state, the line switching circuit 6 and the H relay 3 are set so that the line 5 is connected to the telephone 1.

When a call generation limitation is requested from the console unit 7 by the operator (S21), the call generation limitation flag is turned on (S22). When the call generation limitation is released (S23), the call generation limitation flag is turned off (S24).

When the CI signal is received from the line 5 and the CI signal is detected by the CI detection circuit 4 (S25), the reception flag is turned on (S26).

At the time of call generation limitation, when the telephone 1 is off hooked (S27) and in case of no reception, the H relay 3 is switched from the line 5 side to the power source side (S29). Since no selection signal is transmitted to the line, the operator cannot perform the speech communication (S30). If there is a reception, since the H relay 3 is not switched to the power source side, the speech communication can be performed (S31).

When the telephone 1 is on hooked (S32) and at the time of call generation limitation (S33), the H relay 3 is again switched to the power source side (S34) and the reception flag is turned off (S35).

In the automatic reception mode, when the CI signal is detected, the line switching circuit 6 is switched to the modem 9 side and the automatic reception is executed.

In a state in which the call generation limitation flag has been turned on, even if the call generation is instructed from the console unit 7, it is rejected.

Figure 4:
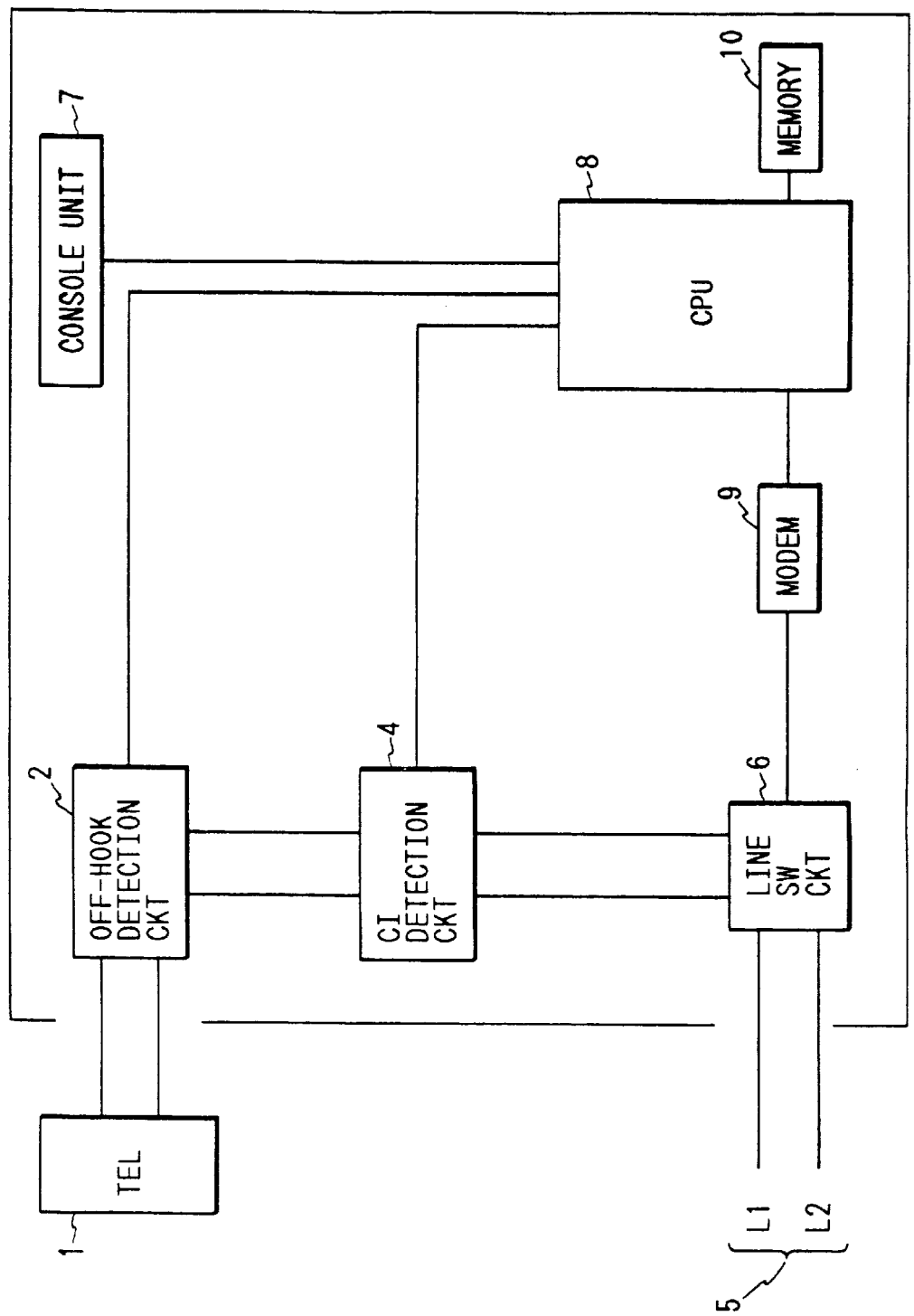
FIG. 4 is a schematic constructional diagram of the third embodiment of the invention.

FIG. 4 shows a construction of the third embodiment of the invention. In FIG. 4, constructing elements which are common to those in FIG. 1 are designated by the same reference numerals.

Figure 5:
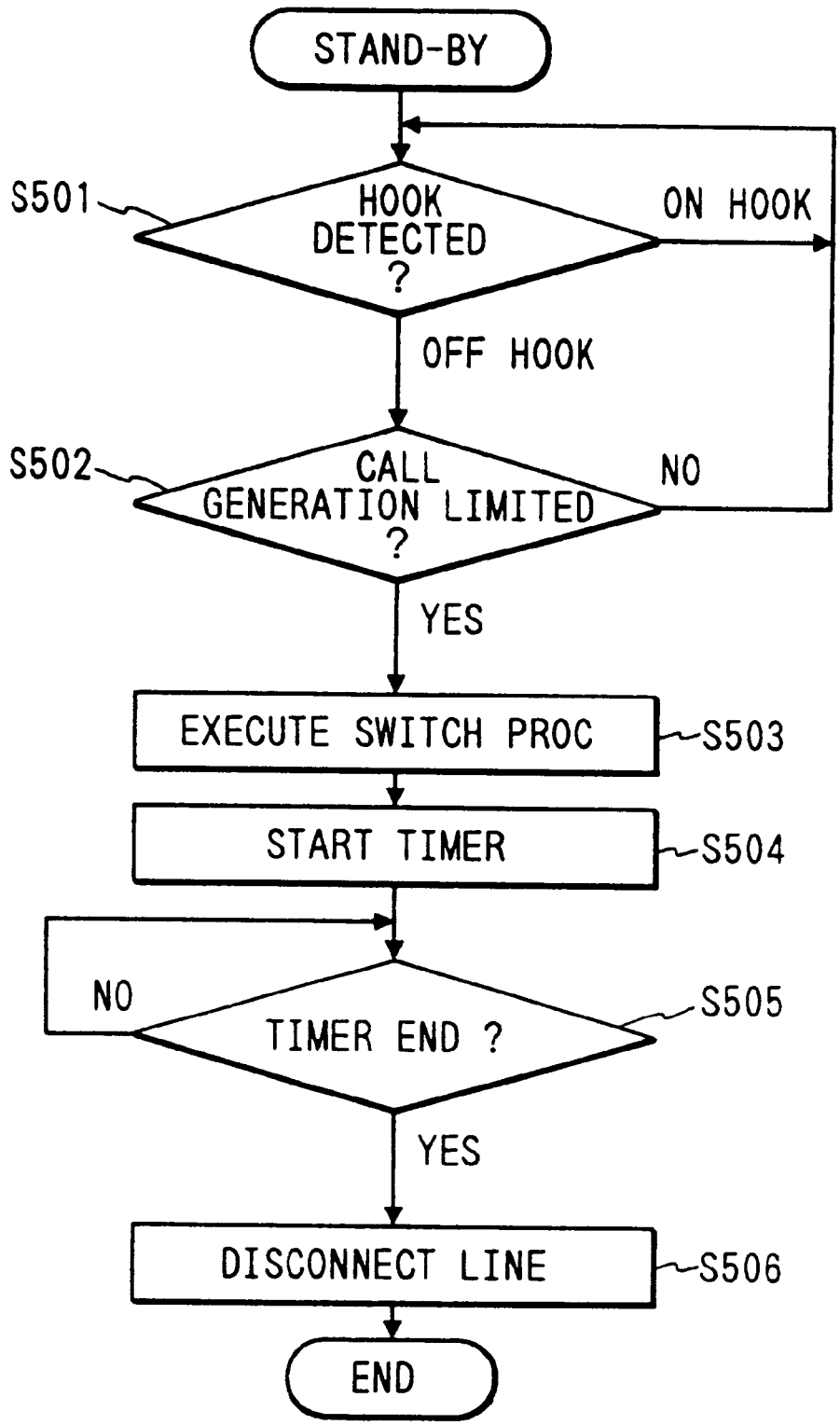
FIG. 5 is a flowchart showing the operation of the third embodiment of the invention.

FIG. 5 is a flowchart showing the operation of the third embodiment.

In a state in which an ordinary call generation limitation is not executed, a call is generated from the telephone 1 and a speech communication with another telephone can be performed through the line 5.

When the call generation is limited, however, a state in which the telephone 1 has been off hooked is detected by the off-hook detection circuit 2 of the facsimile apparatus (S501). When the call generation limitation is judged (S502), the line switching circuit 6 is made operative and switches to the modem 9 side (S503). Due to this, the telephone 1 side is disconnected from the outer line 5 and the speech communication cannot be performed. As mentioned above, the call generation can be also limited in the telephone 1.

The CPU 8 of the facsimile apparatus activates the timer (S504). When the timer is ended after the line was held for a predetermined time (S505), the CPU 8 disconnects the line by returning the line switching circuit 6 to the former state (S506). The value of the timer can be preset from the console unit 7.

The fourth embodiment of the invention will now be explained.

Figure 6:
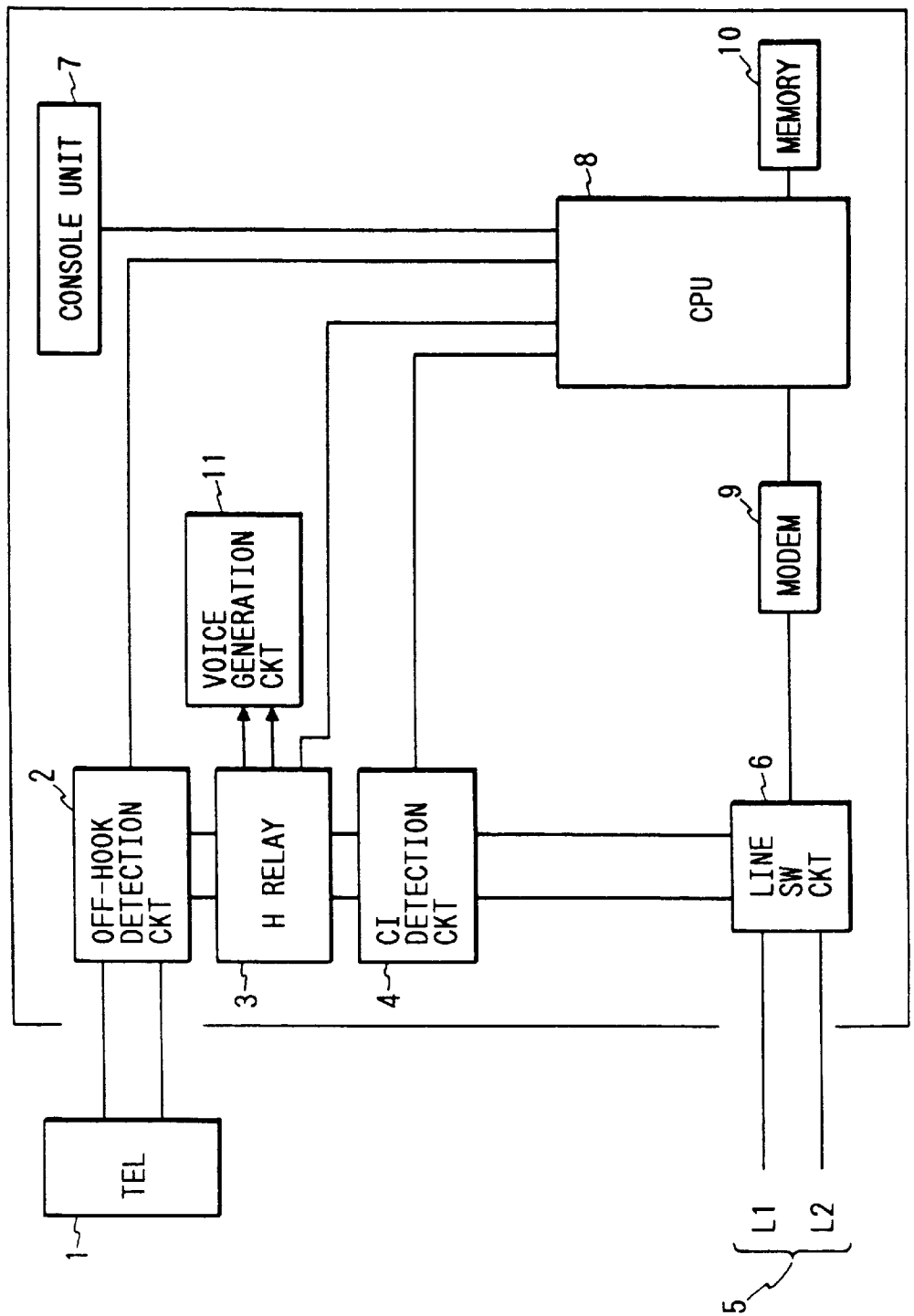
FIG. 6 is a schematic constructional diagram of the fourth embodiment of the invention.
Figure 7:
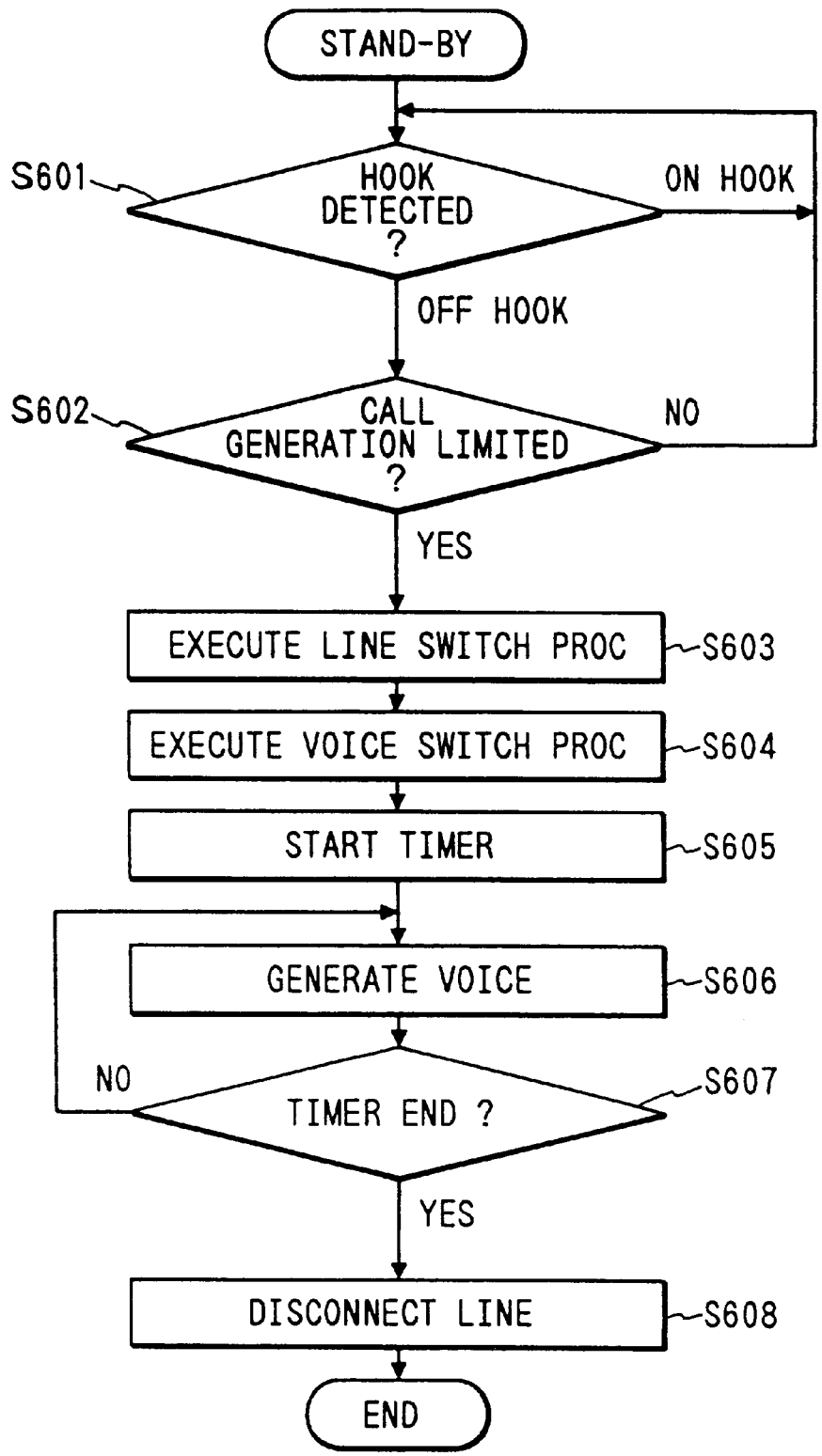
FIG. 7 is a flowchart showing the operation of the fourth embodiment of the invention.

FIG. 6 is a block diagram for explaining a construction of the embodiment. FIG. 7 is a flowchart showing the operation of the embodiment.

In a state in which an ordinary call generation limitation is not executed, a call is generated from the telephone 1 and a speech communication with another telephone can be executed through the line 5.

When the call generation is limited, however, a state in which the telephone 1 has been off hooked is detected by the off-hook detection circuit 2 of the facsimile apparatus (S601). When the call generation limitation is judged (S602), the line switching circuit 6 is made operative and switches to the modem 9 side (S603).

The H relay 3 is switched in order to notify that the line 5 has been switched to the modem 9 side and the call generation has been limited to the telephone 1 side by a voice generation circuit 11 (S604). Due to this, the telephone 1 side is disconnected from the outer line 5 and the speech communication cannot be performed, so that the call generation can be also limited in the telephone 1.

The CPU 8 of the facsimile apparatus starts the timer (S605) and holds the line for a predetermined time. For this period of time, the CPU 8 allows the voice generation circuit 11 to generate a voice indicative of the execution of the call generation limitation to the telephone 1 (S606). When the timer is ended (S607), by returning the H relay 3 and the line switching circuit 6 to the original states, the line is disconnected (S608).

In step S606, the CPU 8 notifies the telephone 1 by voice that the call generation is limited and also displays the call generation limitation on a display of the console unit 7.

The CPU 8 repetitively executes the notification by the voice and the notification by the display simultaneously or sequentially.

The priority order of the notification by the voice and the notification by the display can be preset from the console unit 7.

In the automatic reception mode, when the CI signal is detected, the line switching circuit 6 is switched to the modem 9 side and the automatic reception is executed.

In a state in which the call generation limitation flag has been turned on, even a call generation is instructed from the console unit 7, it is rejected.

Although the present invention has been described above on the basis of the preferred embodiments, the invention is not limited to the constructions of the above embodiments. The invention can be also applied to not only an apparatus to communicate facsimile data but also an apparatus to communicate character data. Various modifications are possible within the spirit and scope of the appended claims of the invention.

What is claimed is:

1. A data communication apparatus to which a voice communication terminal is connected, comprising:

data communicating means for communicating data via a line;

connecting means for connecting the voice communication terminal to the line;

supplying means for supplying the voice communication terminal with power while the voice communication terminal is disconnected from the line;

setting means for setting an outgoing call limitation mode in which an outgoing call by the voice communication terminal is limited even if a called party number is input from the voice communication terminal in an off-hook state; and control means for controlling said connecting means so as to disconnect the voice communication terminal from the line in the outgoing call limitation mode even during a time when said data communication means is communicating data.

2. An apparatus according to claim 1, further comprising an incoming call detecting means, and wherein when an incoming call is detected by said incoming call detecting means, even if said outgoing call limitation mode has been set, said control means controls said connecting means so as to connect the terminal and said line.

3. An apparatus according to claim 1, wherein said connecting means includes relay means.

4. An apparatus according to claim 1, wherein the communication apparatus waits for an incoming call.

5. An apparatus according to claim 2, wherein said control means controls said connecting means so as to disconnect the terminal from the line in accordance with the end of an incoming call response of the terminal.

6. An apparatus according to claim 1, further comprising detecting means for detecting a hook state of the terminal, and wherein when an off hook is detected by said detecting means, if said outgoing call limitation mode has been set, said control means controls said connecting means so as to disconnect the terminal from the line.

7. An apparatus according to claim 1, further comprising output means for outputting a signal indicating that the outgoing call limitation mode has been set to the terminal.

8. An apparatus according to claim 7, wherein said output means outputs the signal in accordance with the off hook of the terminal.

9. An apparatus according to claim 1, further comprising display means for displaying that the apparatus is in the outgoing call limitation mode.

10. An apparatus according to claim 1, wherein said communicating means has a modem.

11. An apparatus according to claim 1, wherein said communicating means executes a facsimile communication.

12. An apparatus according to claim 1, further comprising dial signal transmitting means, and wherein a transmission by said dial signal transmission means is limited in said outgoing call limitation mode.

13. An outgoing call limitation method for a data communication apparatus including a data communication unit for communicating data via a line and being capable of connecting a voice communication terminal, the data communication apparatus further including a setting unit for setting an outgoing call limitation mode, comprising the steps of:

discriminating whether the outgoing call limitation mode is set or not, an outgoing call by the voice communication terminal being limited in the outgoing call limitation mode even if a called party number is input from the voice communication terminal in an off-hook state;

disconnecting the voice communication terminal from the line in the outgoing call limitation mode during a time when the data communication apparatus is communicating data; and supplying the voice communication terminal with power while the voice communication terminal is disconnected from the line.

14. A method according to claim 13, wherein the terminal and the line are disconnected in the outgoing call limitation mode during the time the communication apparatus is in the stand-by state and waiting for an incoming call.

15. A method according to claim 13, wherein the terminal and the line are connected when an incoming call is detected even if the outgoing call limitation mode is set.

16. A method according to claim 13, wherein the terminal and the line are connected or disconnected by a relay.

17. A method according to claim 15, wherein the terminal and the line are disconnected in accordance with an end of an incoming call response of the terminal.

18. A method according to claim 13, wherein the terminal and the line are disconnected in accordance with an off-hook by the terminal and the outgoing call limitation mode.

19. A method according to claim 13, further comprising the step of outputting a signal indicating the outgoing call limitation mode.

20. A method according to claim 19, wherein the signal is output in accordance with an off-hook by the terminal.

21. A method according to claim 13, further comprising the step of displaying that the apparatus is in the outgoing call limitation mode.

22. A method according to claim 13, wherein a modem is connected as the communication unit.

23. A method according to claim 13, further comprising the step of limiting the outgoing call by the communication apparatus in the outgoing call limitation mode.

24. An outgoing call limitation method for a data communication apparatus being capable of connecting a voice communication terminal to a line, the data communication apparatus including a setting unit for setting an outgoing call limitation mode, comprising the steps of:

detecting an incoming call signal from the line;

connecting the voice communication terminal to the line so that the incoming call signal is received by the voice communication terminal; and disconnecting the voice communication terminal from the line after the end of a communication by the voice communication terminal in a case where the outgoing call limitation mode is set, whereby an outgoing call by the voice communication terminal is limited in the outgoing call limitation mode even if a called party number is input from the voice communication terminal in an off-hook state.

25. A method according to claim 24, wherein an on-hook by the terminal is detected as the end of the communication.

26. A method according to claim 24, further comprising the step of limiting the outgoing call by the apparatus.

27. A data communication apparatus being connectable with a voice communication terminal, comprising:

detecting means for detecting an off-hook state of the voice communication terminal;

disconnecting means for disconnecting a connection between the voice communication terminal and a communication line in accordance with the off-hook state of the voice communication terminal detected by said detecting means when a call limitation mode for limiting an outgoing call has been set; and supplying means for supplying the voice communication terminal with power while the voice communication terminal is disconnected from the communication line, whereby an outgoing call by the voice communication terminal is limited in the call limitation mode even if a called party number is input from the voice communication terminal in the off-hook state.

28. An apparatus according to claim 27, wherein said disconnecting means is invalidated in response to an incoming signal.

29. An apparatus according to claim 27, further comprising connecting means for making the connection between the terminal and the communication line in accordance with an on-hook by the terminal.

30. A data communication apparatus being capable of connecting a voice communication terminal to a line, comprising:

setting means for setting an outgoing call limitation mode;

detecting means for detecting an incoming call signal from the line; and switching means for connecting the voice communication terminal to the line so that the incoming call signal is received by the voice communication terminal, wherein said switching means disconnects the voice communication terminal from the line after the end of a communication by the voice communication terminal in a case where the outgoing call limitation mode is set, whereby an outgoing call by the voice communication terminal is limited in the outgoing call limitation mode even if a called party number is input from the voice communication terminal in an off-hook state.

31. An apparatus according to claim 30, wherein an on-hook by the terminal is detected as the end of the communication.

32. An apparatus according to claim 30, further comprising means for limiting the outgoing call by the apparatus.

33. An outgoing call limitation method for a data communication apparatus being connectable with a voice communication terminal, comprising the steps of:

detecting an off-hook state of the voice communication terminal; and disconnecting the voice communication terminal from a communication line in accordance with the off-hook state of the voice communication terminal detected in said detecting step when a call limitation mode for limiting an outgoing call has been set;

supplying the voice communication terminal with power while the voice communication terminal is disconnected from the communication line, whereby an outgoing call by the voice communication terminal is limited in the call limitation mode even if a called party number is input from the voice communication terminal in the off-hook state.

34. A method according to claim 33, wherein said disconnecting step is invalidated in response to an incoming signal.

35. A method according to claim 33, further comprising a connecting step of making the connection between the terminal and the communication line in accordance with an on-hook by the terminal.

36. A data communication apparatus being capable of connecting a voice communication terminal to a line, comprising:

setting means for setting an outgoing call limitation mode in which an outgoing call by the voice communication terminal is limited even if a called party number is input from the voice communication terminal in an off-hook state;

detecting means for detecting an incoming call; and switching means for disconnecting the voice communication terminal from the line in a case where no incoming call is detected by said detecting means and the outgoing call limitation mode is set.

37. An apparatus according to claim 36, wherein said switching means connects the terminal and the line in accordance with an on-hook operation of the terminal.

38. An outgoing call limitation method for a data communication apparatus which is capable of connecting a voice communication terminal to a line and which includes a setting unit for setting an outgoing call limitation mode in which an outgoing call by the voice communication terminal is limited even if a called party number is input from the voice communication terminal in an off-hook state, comprising the steps of:

connecting the voice communication terminal and the line;

detecting an incoming call; and disconnecting the voice communication terminal from the line in a case where no incoming call is detected in said detecting step while the outgoing call limitation mode is set.

39. A method according to claim 38, wherein the terminal and the line is connected in accordance with an on-hook operation of the terminal.

* * * * *

UNITED STATES PATENT AND TRADEMARK OFFICE
CERTIFICATE OF CORRECTION

PATENT NO. : 6,346,995 B1 Page 1 of 1
DATED : February 12, 2002
INVENTOR(S) : Kaori Nakagawa et al.

It is certified that error appears in the above-identified patent and that said Letters Patent is hereby corrected as shown below:

Title page,
Item [56], References Cited, please insert, -- JP     57-188171     11/1982 --.
Please insert, -- JP     61-118068     6/1986 --.

Column 1,
Line 49, "Fig. 2 is comprised of" should be deleted.
Line 51, "Fig. 3 is comprised of" should be deleted.

Column 2,
Line 24, "t0" should read -- to --.
Line 25, "the telephone." should read -- telephone 1. --

Signed and Sealed this

Twenty-ninth Day of October, 2002

Attest:

JAMES E. ROGAN
Attesting Officer         Director of the United States Patent and Trademark Office